US012705536B2

(12) United States Patent
Lee

(10) Patent No.: US 12,705,536 B2
(45) Date of Patent: Aug. 11, 2026

(54) METHOD FOR DOMAIN ADAPTATION AND SYSTEM THEREOF

(71) Applicant: SAMSUNG SDS CO., LTD., Seoul (KR)

(72) Inventor: Joon Ho Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 522 days.

(21) Appl. No.: 18/243,391

(22) Filed: Sep. 7, 2023

(65) Prior Publication Data

US 2024/0086765 A1 Mar. 14, 2024

(30) Foreign Application Priority Data

Sep. 8, 2022 (KR) ........................ 10-2022-0114118

(51) Int. Cl.
*H04L 29/06* (2006.01)
*G06N 20/00* (2019.01)

(52) U.S. Cl.
CPC .................................... *G06N 20/00* (2019.01)

(58) Field of Classification Search
CPC .......... G06N 20/00; G06N 3/08; G06N 3/088; G06N 3/045
See application file for complete search history.

(56) References Cited

U.S. PATENT DOCUMENTS 11,455,496 B2 * 9/2022 Nikolenko ............. G06N 3/047
2021/0019629 A1 1/2021 Chidlovskii
2021/0390270 A1 12/2021 Fei et al.
2022/0092354 A1 * 3/2022 Kunde .................. G06F 18/213
2022/0108134 A1 4/2022 Marrero et al.
2022/0180200 A1 6/2022 Yu et al.
2022/0207865 A1 * 6/2022 Muhammad ........... G06N 3/096
2023/0063209 A1 * 3/2023 Oreifej ..................... G06N 3/08
2024/0054349 A1 * 2/2024 Tai ......................... G06N 3/084

FOREIGN PATENT DOCUMENTS

CN 113673555 A * 11/2021 ........... G06F 18/214
JP 2022-42487 A 3/2022
JP 2022-73988 A 5/2022
KR 10-2020-0065433 A 6/2020
KR 10-2022-0060894 A 5/2022
WO WO-2022206498 A1 * 10/2022 ............ G06N 3/045

* cited by examiner

*Primary Examiner* — Shawnchoy Rahman

(74) *Attorney, Agent, or Firm* — Sughrue Mion, PLLC

(57) ABSTRACT

Provided are a method for domain adaptation and a system thereof. The method according to some embodiments of the present disclosure may include obtaining a model trained using a labeled dataset of a source domain, wherein the model comprises a feature extractor configured to extract a feature from an input data sample and a predictor configured to predict a label based on the extracted feature, selecting a first data sample from an unlabeled dataset of a target domain, generating a second data sample through data augmentation on the first data sample, calculating a consistency loss between the first data sample and the second data sample by using at least one of the feature extractor or the predictor, and updating the feature extractor based on the consistency loss.

15 Claims, 14 Drawing Sheets

METHOD FOR DOMAIN ADAPTATION AND SYSTEM THEREOF

This application claims priority from Korean Patent Application No. 10-2022-0114118, filed on Sep. 8, 2022, in the Korean Intellectual Property Office, the disclosure of which is incorporated herein in its entirety by reference.

BACKGROUND

1. Field

The present disclosure relates to a method for domain adaptation and a system thereof, and more particularly, to a method of adapting a model trained in a source domain to a target domain and a system for performing the method.

2. Description of the Related Art

Domain adaptation is a learning technique designed to solve the problem of lack of labels in a target domain and the problem of domain shift. It is a technique of training a model using a labeled dataset of a source domain and then adapting the trained model to the target domain using a dataset of the target domain. Domain adaptation is a kind of transfer learning technique.

Recently, research on a technique for performing domain adaptation using only an unlabeled dataset of the target domain (so-called 'unsupervised domain adaptation') has received great attention, and several techniques have been proposed. However, since the proposed techniques also use a labeled dataset of the source domain in an adaptation process (e.g., an additional learning process), they may not be viewed as completely unsupervised methods. In addition, the proposed techniques have a clear limitation that they may not be used in an environment in which access to source datasets (i.e., datasets of the source domain) is restricted for reasons such as security and privacy.

SUMMARY

Aspects of the present disclosure provide a method of accurately performing domain adaptation using an unlabeled dataset of a target domain (i.e., in an 'unsupervised' manner) and a system for performing the method.

Aspects of the present disclosure also provide a method of accurately performing domain adaptation without using a labeled dataset of a source domain (i.e., in a 'source-free' manner) and a system for performing the method.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a method for domain adaptation performed by at least one computing device. The method may comprise obtaining a model trained using a labeled dataset of a source domain, wherein the model comprises a feature extractor configured to extract a feature from an input data sample and a predictor configured to predict a label based on the extracted feature, selecting a first data sample from an unlabeled dataset of a target domain, generating a second data sample through data augmentation on the first data sample, calculating a consistency loss between the first data sample and the second data sample by using at least one of the feature extractor or the predictor, and updating the feature extractor based on the consistency loss.

In some embodiments, the model may be additionally trained using only the unlabeled dataset of the target domain without using the labeled dataset of the source domain.

In some embodiments, the calculating of the consistency loss may comprise extracting a first feature from the first data sample through the feature extractor, extracting a second feature from the second data sample through the feature extractor, and calculating the consistency loss based on a difference between the first feature and the second feature.

In some embodiments, the calculating of the consistency loss may comprise generating a pseudo label for the first data sample using the trained model, predicting a label of the second data sample through the trained model, and calculating the consistency loss based on a difference between the pseudo label and the predicted label.

In some embodiments, the predictor may be configured to predict a class label of the input data sample, and the method may further comprise calculating a confidence score for each class for the first data sample through the trained model, and updating the feature extractor based on an entropy loss for the confidence score for each class.

In some embodiments, the predictor may be configured to predict a class label of the input data sample, and the method may further comprise calculating a confidence score for each class for the first data sample through the trained model, and updating the feature extractor based on an entropy loss for the confidence score for each class.

In some embodiments, the consistency loss may be a loss related to a feature extracted using the feature extractor, and the predictor may be configured to predict a class label of the input data sample, and the updating of the feature extractor may comprise calculating a confidence score for each class for the first data sample through the trained model, aggregating an entropy loss for the confidence score for each class and the consistency loss based on predetermined weights, and updating the feature extractor based on a result of the aggregating, wherein a weight assigned to the entropy loss is greater than or equal to a weight assigned to the consistency loss.

In some embodiments, the consistency loss may be a loss related to a label predicted using the predictor, and the predictor may be configured to predict a class label of the input data sample, and the updating of the feature extractor may comprise calculating a confidence score for each class for the first data sample through the trained model, aggregating an entropy loss for the confidence score for each class and the consistency loss based on predetermined weights, and updating the feature extractor based on a result of the aggregating, wherein a weight assigned to the entropy loss is less than or equal to a weight assigned to the consistency loss.

In some embodiments, the method may further comprise generating a third data sample through data augmentation on the first data sample, and updating the feature extractor through a consistency loss between the second data sample and the third data sample.

In some embodiments, the updating of the feature extractor may comprise updating the feature extractor in a state where the predictor is frozen.

According to another aspect of the present disclosure, there is provided a method for domain adaptation performed by at least one computing device. The method may comprise obtaining a model built through training on a labeled dataset of a source domain and additional training on an unlabeled dataset of a target domain, wherein the model comprises a feature extractor configured to extract a feature from an input data sample and a predictor configured to predict a label based on the extracted feature, and predicting a label of data belonging to the target domain by using the model, wherein the additional training comprises selecting a first data sample from the unlabeled dataset of the target domain, generating a second data sample through data augmentation on the first data sample, calculating a consistency loss between the first data sample and the second data sample by using at least one of the feature extractor or the predictor, and updating the feature extractor based on the consistency loss.

In some embodiments, the model may be additionally trained using only the unlabeled dataset of the target domain without using the labeled dataset of the source domain.

In some embodiments, the updating of the feature extractor may comprise updating the feature extractor in a state where the predictor is frozen.

According to yet another aspect of the present disclosure, there is provided a system for domain adaptation. The system may comprise one or more processors, and a memory storing one or more instructions, wherein the one or more processors, by executing the stored one or more instructions, perform: obtaining a model trained using a labeled dataset of a source domain, wherein the model comprises a feature extractor configured to extract a feature from an input data sample and a predictor configured to predict a label based on the extracted feature, selecting a first data sample from an unlabeled dataset of a target domain, generating a second data sample through data augmentation on the first data sample, calculating a consistency loss between the first data sample and the second data sample by using at least one of the feature extractor or the predictor, and updating the feature extractor based on the consistency loss.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
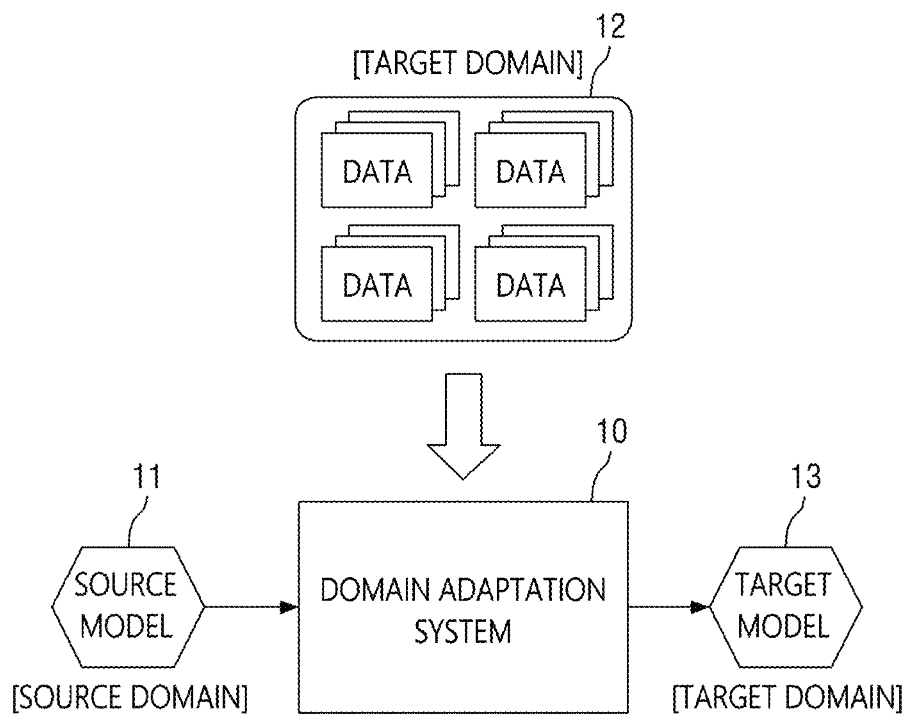
FIGS. 1 and 2 are example diagrams schematically illustrating a domain adaptation system according to embodiments of the present disclosure.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that may be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, various embodiments of the present disclosure will be described in detail with reference to the accompanying drawings.

FIG. 1 is an example diagram schematically illustrating a domain adaptation system 10 according to embodiments of the present disclosure.

As illustrated in FIG. 1, the domain adaptation system 10 may be a system that may build a model 13 suitable for a target domain from a source model 11 by using an unlabeled dataset 12 (hereinafter, referred to as a 'target dataset') of the target domain. That is, the domain adaptation system 10 may build a target model 13 by performing unsupervised domain adaptation on the source model 11 using the target dataset 12. For ease of description, the domain adaptation system 10 will hereinafter be abbreviated to an 'adaptation system 10'.

For reference, the source model 11 may refer to a model that has learned (i.e., supervised learning) a labeled dataset (hereinafter, referred to as a 'source dataset') of a source domain, and the target model 13 may refer to a model to be applied to the target domain, that is, the source model 11 adapted (additionally trained) to suit the target domain.

More specifically, the adaptation system 10 may generate at least one virtual data sample through data augmentation on a data sample of the target dataset 12 and may additionally train the source model 11 based on a consistency loss between the data sample and the virtual data sample. The target model 13 may be built by repeating this additional training process for other data samples. This will be described in detail later with reference to FIG. 3 and subsequent drawings.

For reference, the target dataset 12 may be composed of a plurality of data samples, and each of the data samples may refer to one unit of data input to the models 11 and 13. In the art to which the present disclosure pertains, the term 'sample' may be used interchangeably with terms such as example, instance, observation, record, unit data, and individual data.

Figure 2:
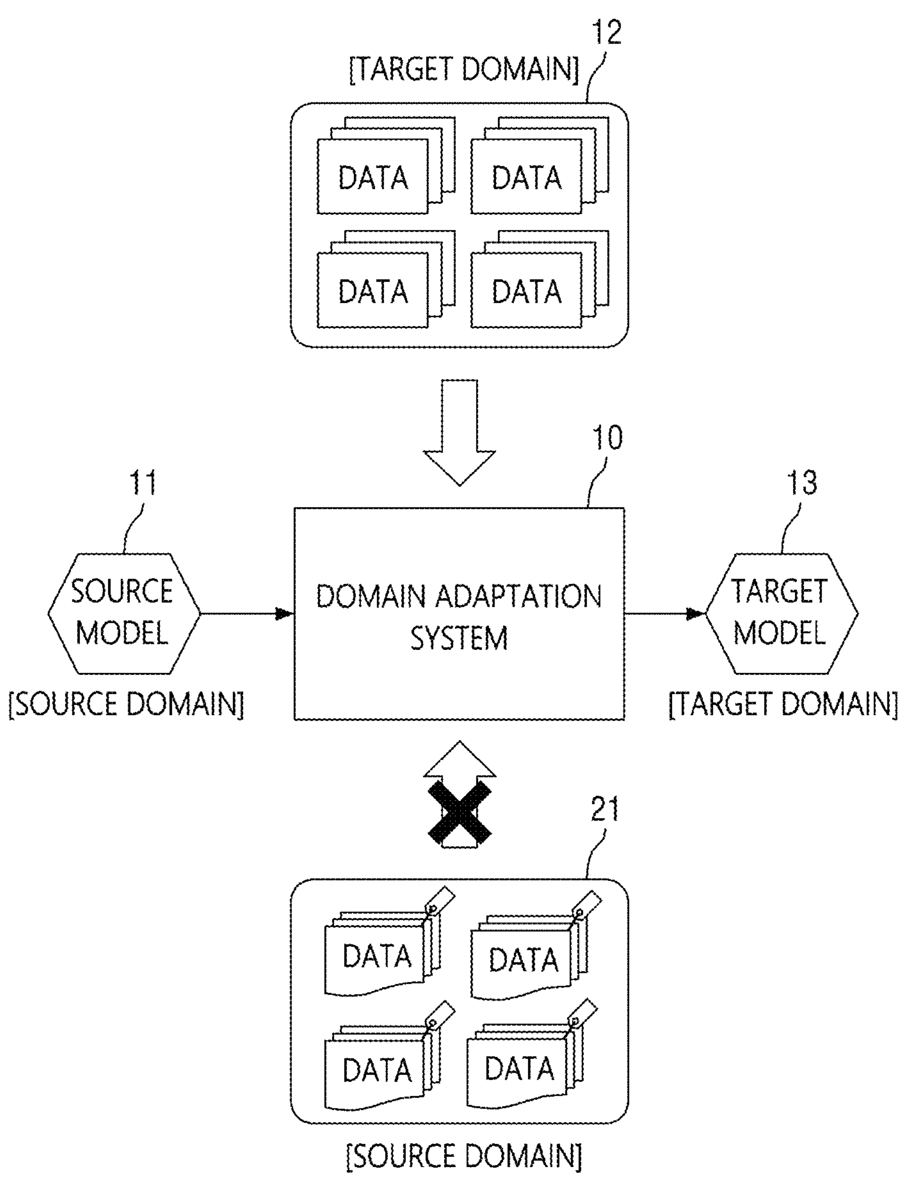

In some embodiments, as illustrated in FIG. 2, the adaptation system 10 may perform domain adaptation using only the target dataset 12 (i.e., in a completely unsupervised manner) without using a labeled source dataset 21 (i.e., in a source-free manner). For example, even in an environment in which access to the source dataset 21 is restricted due to reasons such as security and privacy, the adaptation system 10 may build the target model 13 (i.e., a high-performance model) suitable for the target domain by using only the target dataset 12. This will also be described with reference to FIG. 3 and subsequent drawings.

In addition, the adaptation system 10 may perform a prediction task in the target domain using the target model 13. That is, the adaptation system 10 may predict a label of data (set) belonging to the target domain using the target model 13. Here, the format and value of the label may vary according to the prediction task, and examples of the prediction task may include classification, regression, and semantic segmentation which is a kind of classification task. However, the scope of the present disclosure is not limited by these examples.

A specific method of performing domain adaptation using the adaptation system 10 will be described in more detail with reference to FIG. 3 and subsequent drawings.

The adaptation system 10 may be implemented in at least one computing device. For example, all functions of the adaptation system 10 may be implemented in one computing device, or a first function of the adaptation system 10 may be implemented in a first computing device, and a second function may be implemented in a second computing device. Alternatively, a certain function of the adaptation system 10 may be implemented in a plurality of computing devices.

Figure 17:
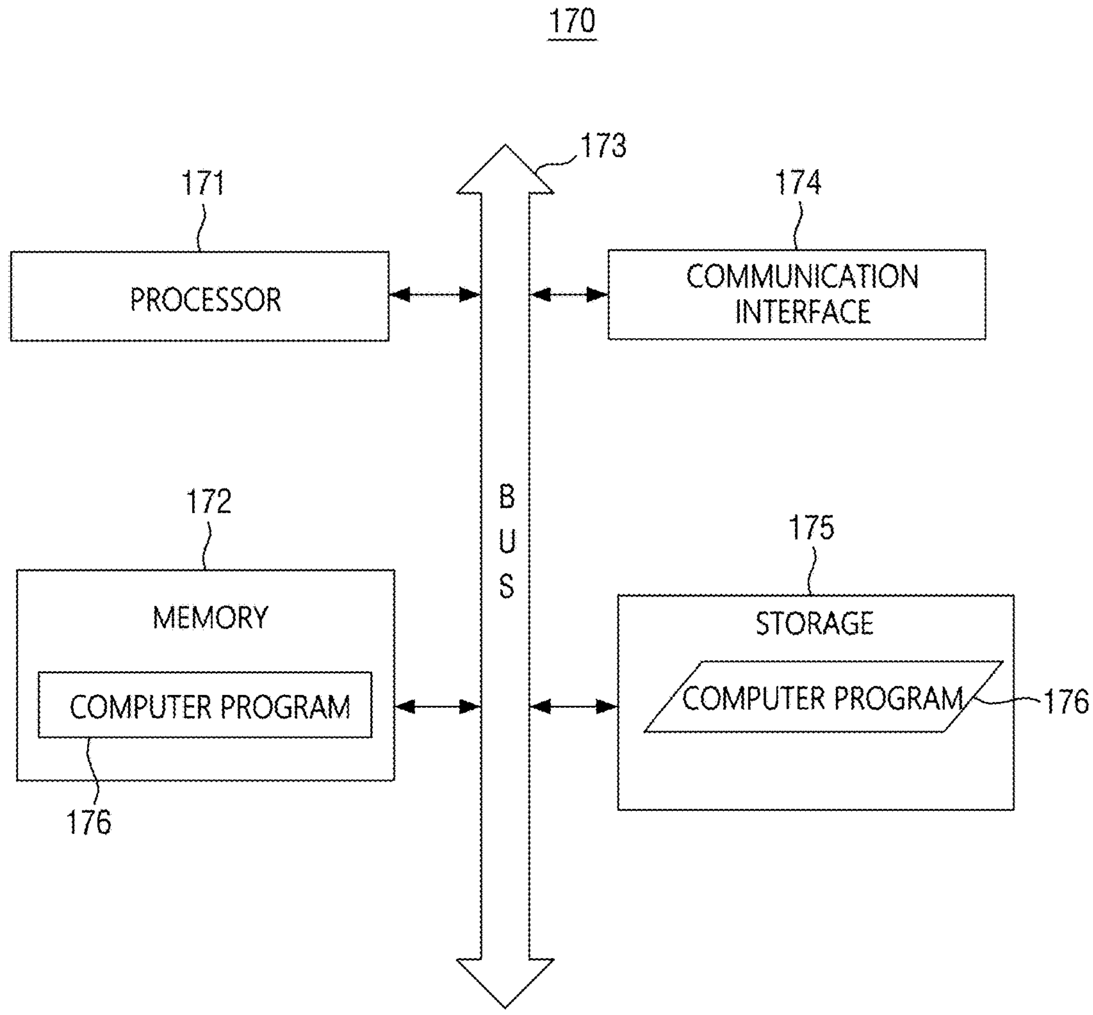
FIG. 17 illustrates an example computing device that may implement the domain adaptation system according to the embodiments of the present disclosure.

A computing device may be any device having a computing function, and an example of this device is illustrated in FIG. 17. Since the computing device is a collection of various components (e.g., a memory, a processor, etc.) interacting with each other, it may be named a 'computing system' in some cases. In addition, the computing system may also refer to a collection of a plurality of computing devices interacting with each other.

Until now, the adaptation system 10 according to the embodiments of the present disclosure has been roughly described with reference to FIGS. 1 and 2. Hereinafter, various methods that may be performed by the above-described adaptation system 10 will be described with reference to FIG. 3 and subsequent drawings.

For ease of understanding, the description will be continued based on the assumption that all steps/operations of the methods to be described later are performed by the above-described adaptation system 10. Therefore, when the subject of a specific step/operation is omitted, it may be understood that the step/operation is performed by the adaptation system 10. However, in a real environment, some steps of the methods to be described later may also be performed by another computing device. For example, a prediction task using the target model (e.g., 13 in FIG. 1) may also be performed by another computing device.

Figure 3:
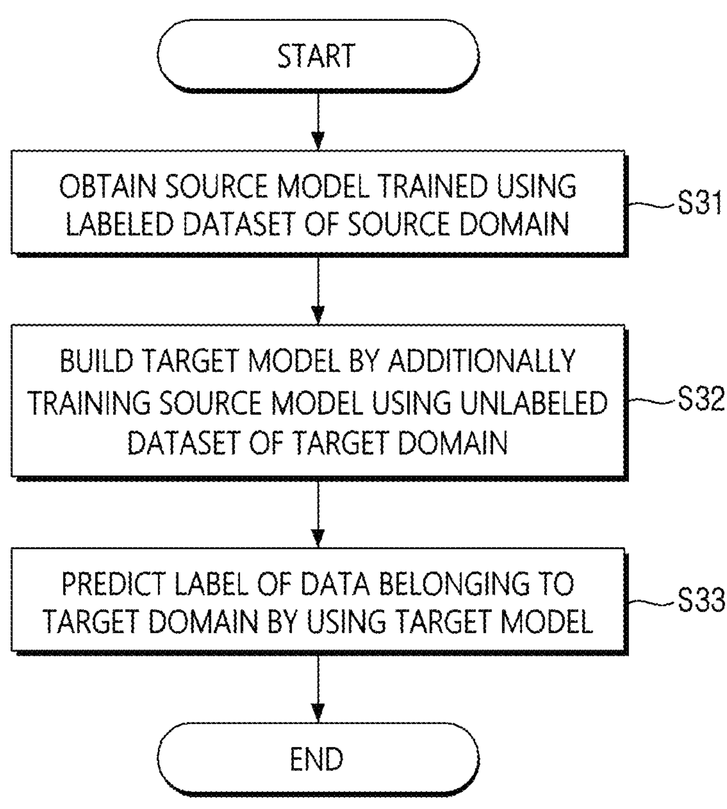
FIG. 3 is an example flowchart schematically illustrating a domain adaptation method according to embodiments of the present disclosure.

FIG. 3 is an example flowchart schematically illustrating a domain adaptation method according to embodiments of the present disclosure. However, this is only an exemplary embodiment for achieving the objectives of the present disclosure, and some operations may be added or deleted as needed.

As illustrated in FIG. 3, the domain adaptation method according to the embodiments may start with operation S31 in which a source model trained (i.e., supervised learning) using a source dataset (i.e., a labeled dataset of a source domain) is obtained. A specific method of training the source model may be any method.

Figure 4:
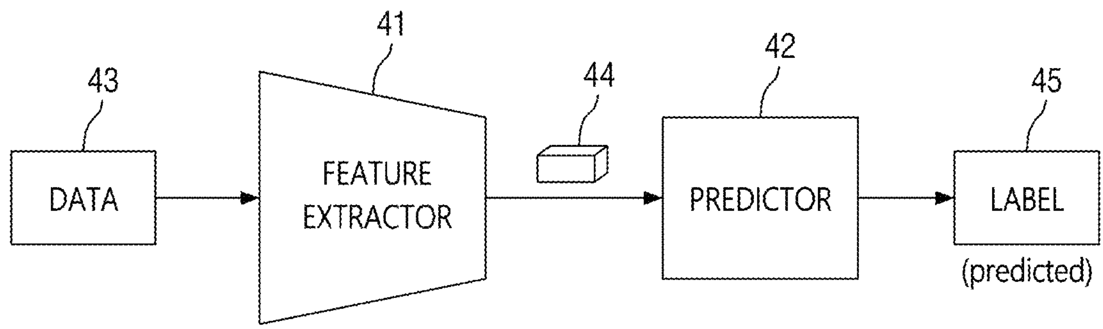
FIGS. 4 and 5 illustrate example structures of a source model which may be referred to in some embodiments of the present disclosure.
Figure 5:
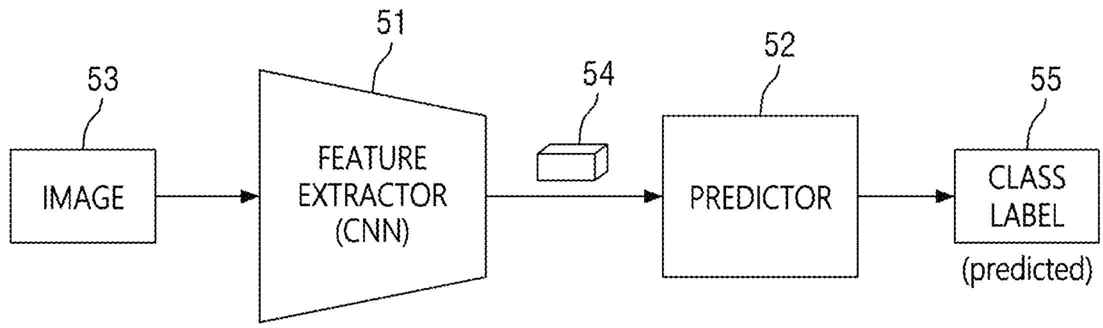

Example structures of the source model are illustrated in FIGS. 4 and 5. For ease of understanding, the structure and operation of the source model will now be briefly described.

As illustrated in FIG. 4, the source model may be configured to include a feature extractor 41 and a predictor 42. In some cases, the source model may further include other modules.

The feature extractor 41 may refer to a module that extracts a feature 44 from an input data sample 43. The feature extractor 41 may be implemented as, for example, a neural network layer and may be named a 'feature extraction layer' in some cases.

The predictor 42 may refer to a module that predicts a label 45 of the data sample 43 from the extracted feature 44. The predictor 42 may be understood as a kind of task-specific layer, and a detailed structure of the predictor 42 may vary according to task. In addition, the format and value of the label 45 may vary according to task. The predictor 42 may also be implemented as, for example, a neural network layer and may be named as a 'prediction layer' or an 'output layer' in some cases.

FIG. 5 illustrates an example structure of a source model that performs an image classification task.

As illustrated in FIG. 5, the source model performing the image classification task may also be configured to include a feature extractor 51 and a predictor 52.

The feature extractor 51 may extract a feature 54 from an image sample 53 and may be implemented as, for example, a convolutional neural network (or layer). However, the scope of the present disclosure is not limited thereto.

The predictor 52 may predict a class label 55 of the image sample 53 from the feature 54. Here, predicting the class label 55 may refer to calculating (outputting) a confidence score for each class or may refer to determining the class of the image sample 53 based on the calculated confidence score for each class. That is, the value of the class label 55 may be a confidence score for each class or a value indicating a class. The predictor 52 may be implemented as, for example, a fully-connected layer, but the scope of the present disclosure is not limited thereto.

Referring back to FIG. 3, in operation (step) S32, a target model may be built by additionally training the source model using a target dataset (i.e., an unlabeled dataset of a target domain). As described above, the target model may refer to the source model adapted to the target domain. A detailed process of the current operation will be described in detail with reference to FIG. 6 and subsequent drawings.

In operation S33, a label of data belonging to the target domain may be predicted using the target model. That is, a prediction task may be performed in the target domain using the target model. For example, if the target model is a model that performs an image classification task, the adaptation system 10 may predict a class label of an image (set) belonging to the target domain by using the target model.

Until now, the domain adaptation method according to the embodiments of the present disclosure has been roughly described with reference to FIGS. 3 through 5. Hereinafter, the process of additionally training the source model (i.e., domain adaptation) will be described in detail with reference to FIG. 6 and subsequent drawings.

Figure 6:
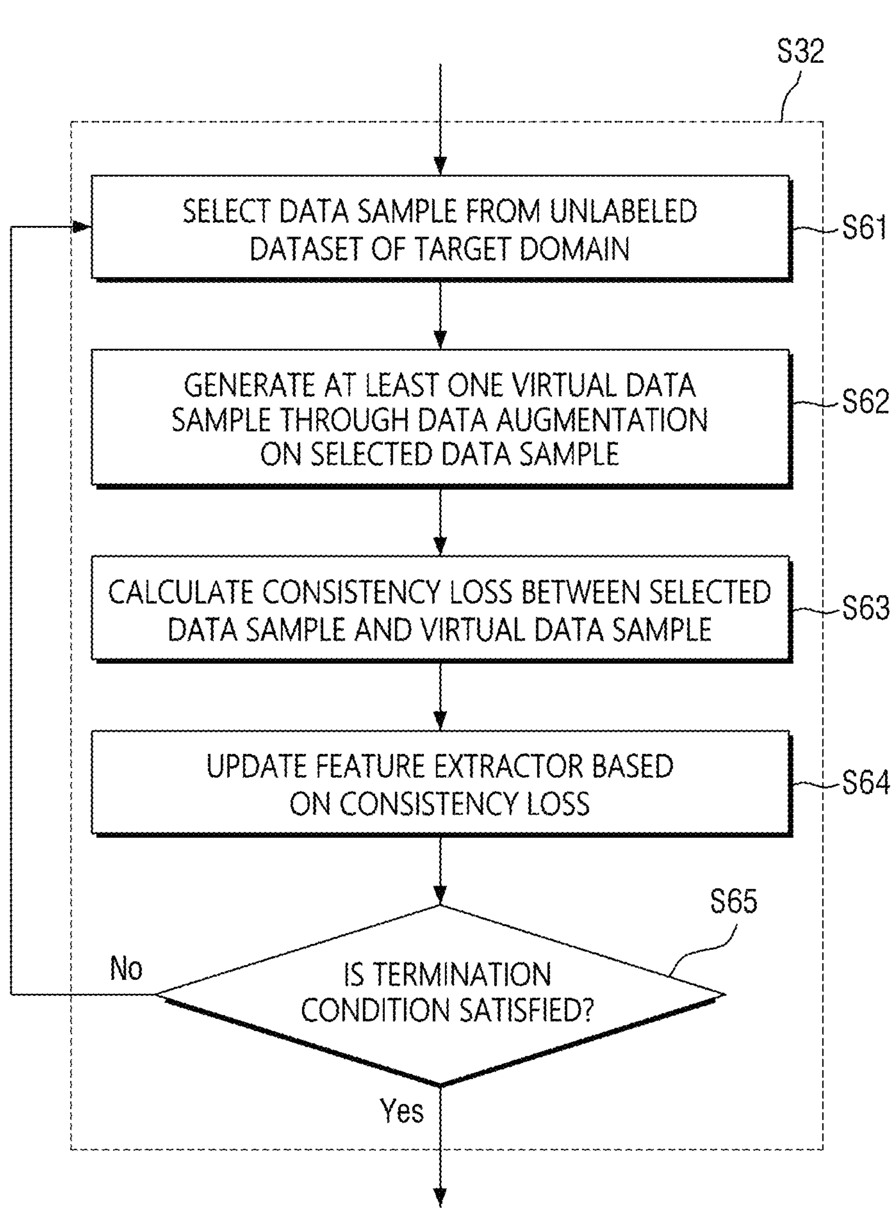
FIG. 6 is an example flowchart illustrating a detailed process of an operation of additionally training the source model in FIG. 3.

FIG. 6 is an example flowchart illustrating a detailed process of operation S32 of FIG. 3 in which the source model is additionally trained. However, this is only an exemplary embodiment for achieving the objectives of the present disclosure, and some operations may be added or deleted as needed.

As illustrated in FIG. 6, the additional training of the source model may start with operation S61 in which a data sample is selected from the target dataset. The data sample may be selected in any way. For example, the adaptation system 10 may select a data sample in a random manner or may select a data sample in a sequential manner. If learning is performed on a batch-by-batch basis, the adaptation system 10 may select a number of data samples corresponding to the batch size and configure the selected data samples as one batch.

In operation S62, at least one virtual data sample may be generated through data augmentation on the selected data sample. The number of virtual data samples generated may vary, and the data augmentation method may also vary according to the type, domain, etc. of data.

In operation S63, a consistency loss between the selected data sample and the virtual data sample may be calculated. However, a specific method of calculating the consistency loss may vary according to embodiments.

In some embodiments, a feature-related consistency loss (hereinafter, referred to as a 'first consistency loss') may be calculated using a feature extractor of the source model. The first consistency loss may be used to additionally train the feature extractor to extract similar features from similar data belonging to the target domain. In other words, since the virtual data sample is derived from the selected data sample, the two data samples may be viewed as similar data. Therefore, if the feature extractor is additionally trained to extract similar features from the two data samples, it may be trained to extract similar features from similar data (e.g., data of the same class) belonging to the target domain. The first consistency loss may be calculated based on a difference between a feature extracted from the selected data sample and a feature extracted from the virtual data sample. This will be described later with reference to FIG. 9.

In some embodiments, a label-related consistency loss (hereinafter, referred to as a 'second consistency loss') may be calculated using the feature extractor and predictor of the source model. The second consistency loss may be used to additionally train the feature extractor to align a feature space (or distribution) of the target dataset with a feature space (or distribution) of the source dataset. That is, the second consistency loss may be used to align the distribution of the target dataset with the distribution of the source dataset, thereby converting the source model into a model suitable for the target domain. The second consistency loss may be calculated based on a difference between a pseudo label of the selected data sample and a predicted label of the virtual data sample. This will be described later with reference to FIGS. 10 through 12.

In some embodiments, a consistency loss may be calculated based on a combination of the above embodiments. For example, the adaptation system 10 may calculate a total consistency loss by aggregating the first consistency loss and the second consistency loss based on predetermined weights. Here, a weight assigned to the first consistency loss may be less than or equal to a weight assigned to the second consistency loss. In this case, it has been experimentally confirmed that the performance of the target model is further improved.

Referring back to FIG. 6, in operation S64, the feature extractor may be updated based on the consistency loss. For example, in a state where the predictor is frozen (or fixed) (i.e., the predictor is not updated), the adaptation system 10 may update a weight of the feature extractor in a direction to reduce the consistency loss. In this case, since the predictor serves as an anchor, the feature space of the target dataset may be quickly and accurately aligned with the feature space of the source dataset. For better understanding, a further description will be made with reference to FIG. 7.

Figure 7:
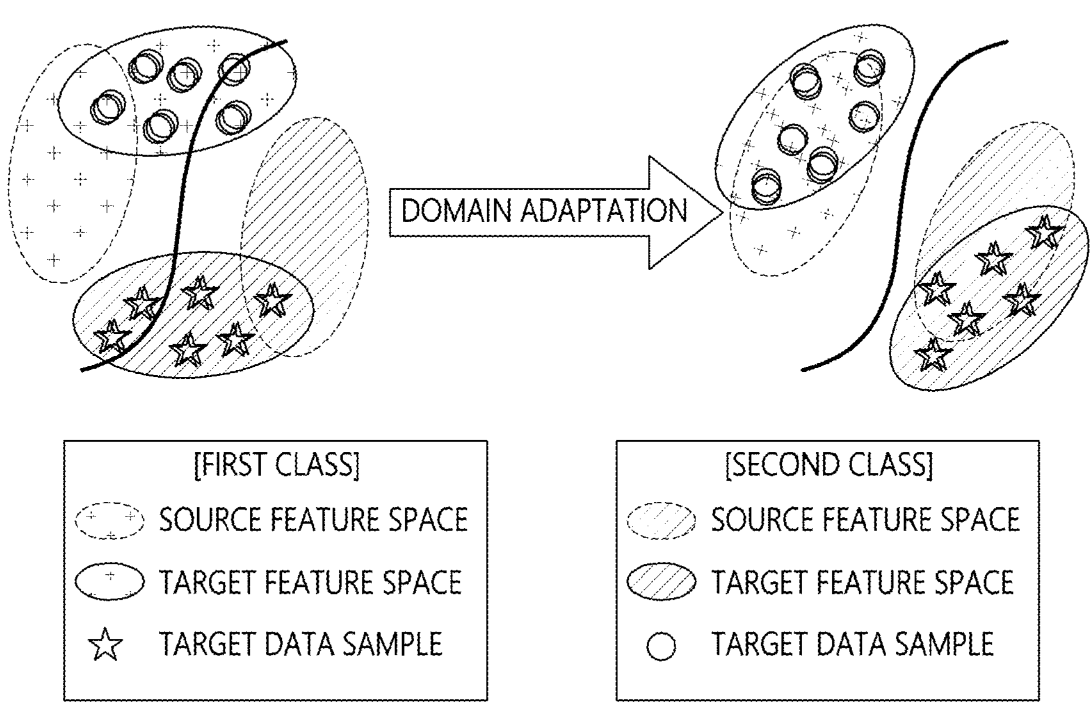
FIG. 7 is an example conceptual diagram for explaining a method of updating a feature extractor in a state where a predictor is frozen according to embodiments of the present disclosure.

FIG. 7 is an example conceptual diagram illustrating a case where the feature space of the target dataset is aligned with the feature space of the source dataset due to an update of the feature extractor. FIG. 7 assumes that the predictor is configured to predict a class label, and a curve illustrated in FIG. 7 indicates a classification curve of the predictor trained using the source dataset.

As illustrated in FIG. 7, if the feature extractor is updated using the target dataset in a state where the predictor is frozen (see the classification curve in the fixed state), the feature space of the target dataset may be quickly and accurately aligned with the feature space of the source dataset. Accordingly, the problem of domain shift (see the left side of FIG. 7) may be easily solved, and the performance of the target model may be greatly improved.

On the other hand, if the feature extractor is updated together with the predictor, the speed at which the feature space of the target dataset and the feature space of the source dataset are aligned may be inevitably slow because the number of weight parameters to be updated increases significantly. In addition, even if the two feature spaces are aligned, the classification performance of the additionally trained model may not be guaranteed because the classification curve illustrated in FIG. 7 is also shifted.

According to embodiments of the present disclosure, an entropy loss for a confidence score for each class may be further calculated. That is, when the predictor is configured to calculate the confidence score for each class, the entropy loss may be calculated based on an entropy value for the confidence score for each class. Then, the feature extractor may be updated based on the calculated entropy loss (i.e., a weight parameter of the feature extractor may be updated in a direction to reduce the entropy loss). The concept and calculation method of entropy will be already familiar to those skilled in the art, and thus a description thereof will be omitted. The entropy loss may prevent the confidence score for each class from being calculated as an ambiguous value (e.g., prevent each class from having a similar confidence score). For example, the entropy loss may be used to prevent the predictor from outputting an ambiguous confidence score for each class by additionally training the feature extractor so that features extracted from the target dataset move away from a decision (classification) boundary in the feature space. Accordingly, the performance of the target model may be further improved.

Figure 8:
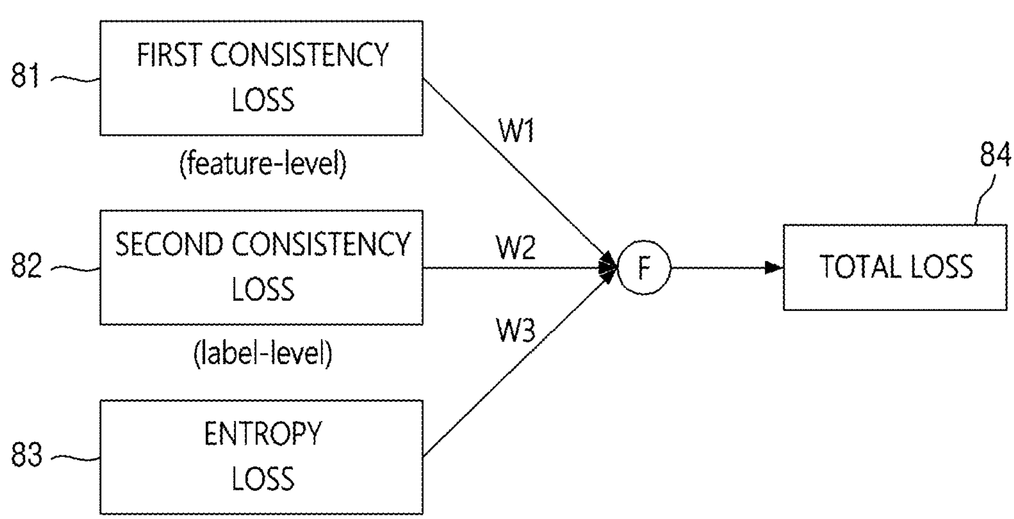
FIG. 8 is an example diagram for explaining a loss calculation method according to embodiments of the present disclosure.

In addition, in some embodiments, a total loss may be calculated by aggregating at least one of the first and second consistency losses and the entropy loss based on predetermined weights, and the feature extractor may be updated based on the total loss. For example, the adaptation system 10 may calculate the total loss by aggregating the first consistency loss and the entropy loss based on predetermined weights. Here, a weight assigned to the entropy loss may be greater than or equal to a weight assigned to the first consistency loss. In this case, it has been confirmed that the performance of the target model is further improved. In another example, the adaptation system 10 may calculate the total loss by aggregating the second consistency loss and the entropy loss based on predetermined weights. Here, the weight assigned to the entropy loss may be less than or equal to a weight assigned to the second consistency loss. In this case, it has been confirmed that the performance of the target model is further improved. In another example, as illustrated in FIG. 8, the adaptation system 10 may calculate a total loss 84 by aggregating two consistency losses 81 and 82 and an entropy loss 83 based on predetermined weights W1 through W3. Here, a second weight W2 may be greater than or equal to a first weight W1 and a third weight W3, and the third weight W3 may be set to a value greater than or equal to the first weight W1. In this case, it has been confirmed that the performance of the target model is further improved. For example, the first weight W1 may be set to a value between about 0 and 0.5, the second weight W2 may be set to a value greater than or equal to about 1.0, and the third weight W3 may be set to a value between about 0.5 and 1.0. However, the scope of the present disclosure is not limited thereto.

Referring back to FIG. 6, in operation S65, it is determined whether a termination condition is satisfied. If the termination condition is not satisfied, operations S61 through S64 described above may be repeated. If satisfied, the additional training of the source model may end. Accordingly, the target model may be built.

The termination condition may be variously set based on, for example, loss (e.g., consistency loss, entropy loss, total loss, etc.) and the number of times of learning. For example, the termination condition may be set to a condition in which a calculated loss is less than or equal to a reference value. However, the scope of the present disclosure is not limited thereto.

Until now, the detailed process of the operation S32 of additionally training the source model has been described with reference to FIGS. 6 through 8. According to the above-described method, domain adaptation may be performed on the source model (i.e., the model that has learned the labeled dataset of the source domain) using only the unlabeled dataset of the target domain (i.e., in an unsupervised manner). Therefore, domain adaptation may be easily performed even in an environment in which access to the labeled dataset of the source domain is restricted due to reasons such as security and privacy. In addition, a high-performance target model may be built by aligning the feature space of the target dataset (or domain) with the feature space of the source dataset (or domain) based on the consistency loss.

Methods of calculating a consistency loss will now be described in detail with reference to FIGS. 9 through 12.

Figure 9:
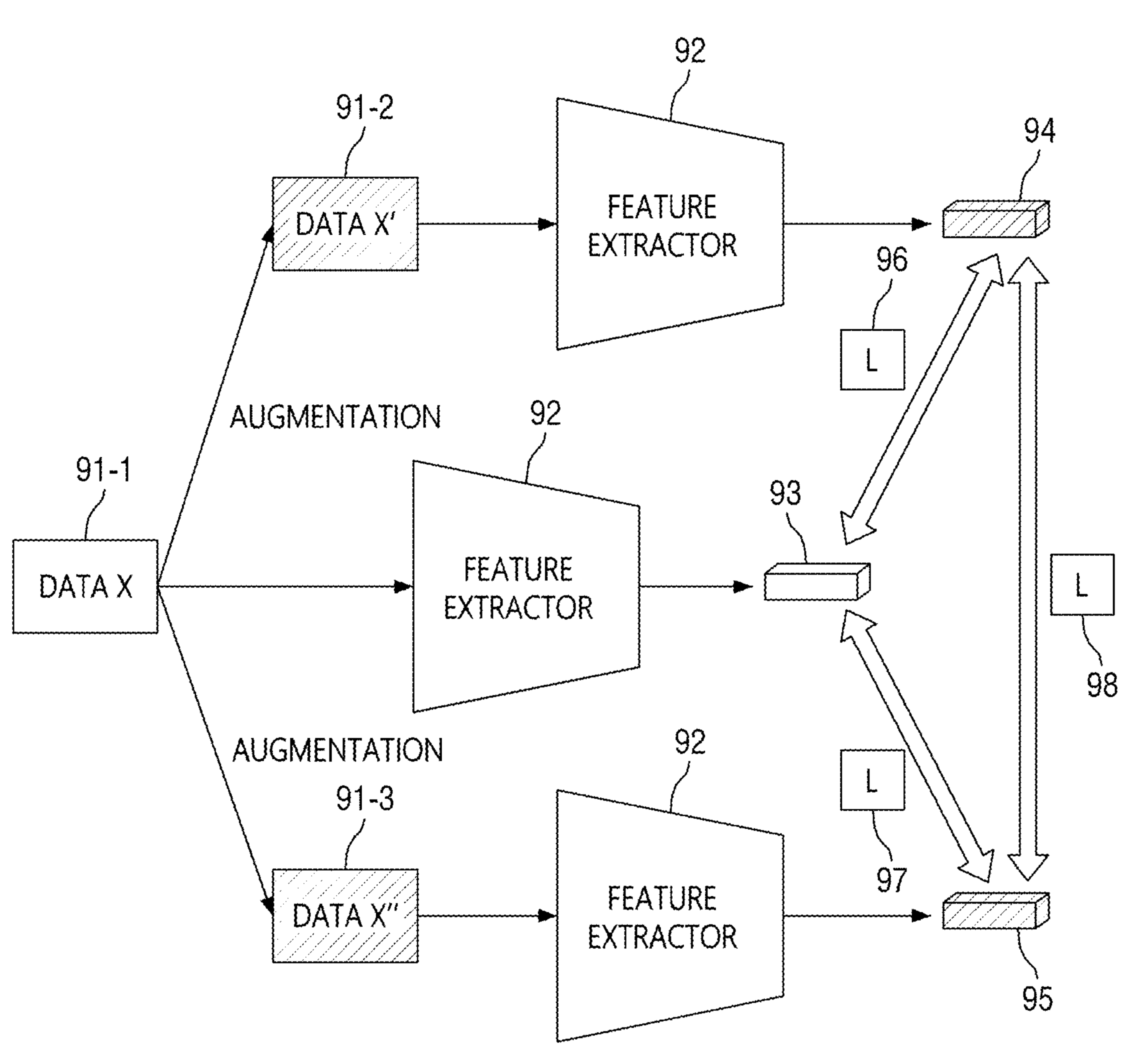
FIG. 9 is an example diagram for explaining a method of calculating a consistency loss according to embodiments of the present disclosure.

FIG. 9 is an example diagram for explaining a method of calculating a consistency loss according to embodiments of the present disclosure. FIG. 9 illustrates a case where two virtual data samples 91-2 and 91-3 are generated from a data sample 91-1 of a target dataset. For a clearer explanation, the data sample 91-1 and the two virtual data samples 91-2 and 91-3 will hereinafter be referred to as a 'first data sample 91-1 (see x)', a 'second data sample 91-2 (see x')', and a 'third data sample 91-3 (see x")', respectively.

As illustrated in FIG. 9, the current embodiments relate to a method of calculating a feature-related consistency loss (i.e., the above-described 'first consistency loss').

The adaptation system 10 may extract features 93 through 95 respectively from the first through third data samples 91-1 through 91-3 through a feature extractor 92. In addition, the adaptation system 10 may calculate a consistency loss (e.g., 96) based on a difference (or distance) between the extracted features (e.g., 93 and 94).

For example, the adaptation system 10 may calculate a consistency loss 96 based on a difference between the feature 93 (hereinafter, referred to as a 'first feature') extracted from the first data sample 91-1 and the feature 94 (hereinafter, referred to as a 'second feature') extracted from the second data sample 91-2. In addition, the adaptation system 10 may calculate a consistency loss 97 based on the first feature 93 and the feature 95 (hereinafter, referred to as a 'third feature') extracted from the third data sample 91-3.

In another example, the adaptation system 10 may calculate a consistency loss 98 between the virtual data samples 91-2 and 91-3 based on a difference between the second feature 94 and the third feature 95.

In another example, the adaptation system 10 may calculate a consistency loss based on various combinations of the above examples. For example, the adaptation system 10 may calculate a total consistency loss by aggregating the consistency losses 96 through 98 based on predetermined weights. Here, a smaller weight may be assigned to the consistency loss 98 between the virtual data samples 91-2 and 91-3 than to the other losses 96 and 97.

In the current embodiments, the difference (or distance) between the features (e.g., 93 and 94) may be calculated by, for example, a cosine distance (or similarity). However, the scope of the present disclosure is not limited thereto. The concept and calculation method of the cosine distance will be already familiar to those skilled in the art, and thus a description thereof will be omitted.

A method of calculating a consistency loss according to embodiments of the present disclosure will now be described with reference to FIGS. 10 through 12.

Figure 10:
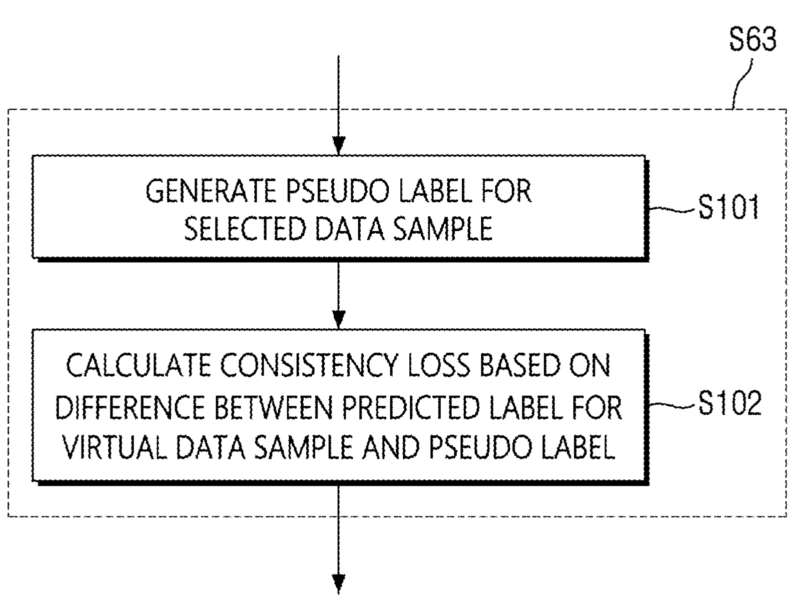
FIG. 10 is an example flowchart illustrating a method of calculating a consistency loss according to embodiments of the present disclosure.

FIG. 10 is an example flowchart illustrating a method of calculating a consistency loss according to embodiments of the present disclosure.

As illustrated in FIG. 10, the current embodiments relate to a method of calculating a label-related consistency loss (i.e., the above-described 'second consistency loss') and may start with operation S101 in which a pseudo label for a selected data sample is generated. However, a specific method of generating the pseudo label may vary according to embodiments. For ease of understanding, the method of generating the pseudo label will be described below based on the assumption that a predictor of a source model is configured to calculate a confidence score for each class. However, the scope of the present disclosure is not limited thereto.

In some embodiments, a confidence score for each class for a data sample calculated through the predictor may be used as a pseudo label of the data sample.

In some embodiments, a prototype feature for each class may be generated by reflecting a confidence score for each class in features extracted from a plurality of data samples included in a target dataset. In addition, a pseudo label may be generated based on a similarity between a feature extracted from a specific data sample and the prototype feature for each class. In this case, a more accurate pseudo label may be generated. The current embodiments will now be further described with reference to FIG. 11.

Figure 11:
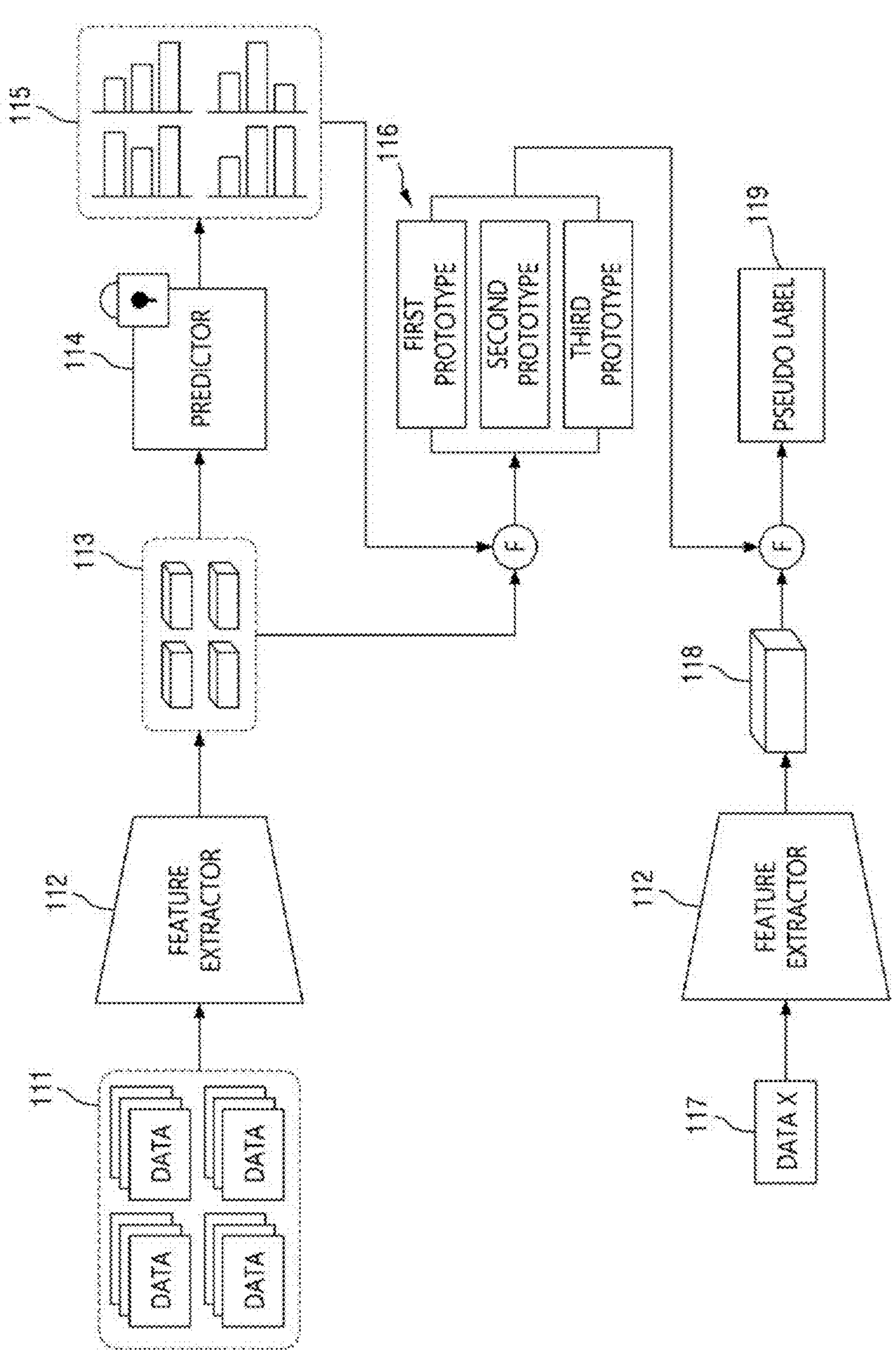
FIG. 11 is an example diagram for explaining a method of generating a pseudo label according to embodiments of the present disclosure.

As illustrated in FIG. 11, the adaptation system 10 may extract a feature 113 from each of a plurality of data samples 111 through a feature extractor 112. Then, the adaptation system 10 may calculate a confidence score 115 for each class from each of the extracted features 113 through a predictor 114. FIG. 11 illustrates a case where the number of classes is three.

Next, the adaptation system 10 may generate a prototype feature 116 for each class by reflecting the confidence score 115 for each class in the features 113 and then aggregating the resultant features. For example, the adaptation system 10 may generate a prototype feature of a first class (see 'first prototype') by reflecting (e.g., multiplying) a confidence score of the first class in each of the features 113 and then aggregating (e.g., averaging, multiplying, multiplying by element, etc.) the resultant features. In addition, the adaptation system 10 may generate prototype features of other classes (see 'second prototype' and 'third prototype') in a similar manner.

Next, the adaptation system 10 may generate a pseudo label 119 of a data sample 117 based on a similarity between a feature 118 extracted from the data sample 117 (see x) and the prototype feature 116 for each class. For example, the adaptation system 10 may calculate a label value for the first class based on the similarity between the extracted feature 118 and the prototype feature of the first class and may calculate label values for other classes in a similar manner. As a result, the pseudo label 119 may be generated.

The similarity between the extracted feature 118 and the prototype feature 116 for each class may be calculated using various methods such as cosine similarity and inner product, and any method may be used to calculate the similarity.

According to the current embodiments, the prototype feature 116 for each class may be accurately generated by weighting and aggregating the features 113 extracted from the data samples 111 based on the confidence score 115 for each class. As a result, the pseudo label 119 for the data sample 117 may be accurately generated.

In the current embodiments, the data samples 111 may be determined in various ways. For example, the data samples 111 may be samples belonging to a batch of data samples 117 for which pseudo labels are to be generated. In this case, the prototype feature (e.g., 116) for each class may be generated for each batch. In another example, the data samples 111 may be samples selected from the target dataset based on the confidence score for each class. In other words, the adaptation system 10 may select at least one data sample, in which the confidence score of the first class is equal to or greater than a reference value, from the target dataset and then generate a prototype feature of the first class by reflecting the confidence score of the first class in a feature of the selected data sample. In addition, the adaptation system 10 may generate prototype features of other classes in a similar manner. In this case, the prototype feature (e.g., 116) for each class may be generated more accurately.

In some embodiments, a pseudo label may be generated based on various combinations of the above embodiments. For example, the adaptation system 10 may generate a first pseudo label using a confidence score for each class of a data sample as it is, generate a second pseudo label using a prototype feature for each class, and generate a final pseudo label for the data sample by aggregating the first pseudo label and the second pseudo label based on predetermined weights. Here, a higher weight may be assigned to the second pseudo label, but the scope of the present disclosure is not limited thereto.

Referring back to FIG. 10, in operation S102, a consistency loss (i.e., the second consistency loss) may be calculated based on a difference between a predicted label for a virtual data sample and the pseudo label. For example, the adaptation system 10 may predict a label of a virtual data sample through a feature extractor and a predictor (i.e., through a feed-forward process on the source model) and calculate the second consistency loss based on a difference between the predicted label (e.g., the confidence score for each class) and the pseudo label of the selected data sample. If the predictor is configured to calculate the confidence score for each class, the difference between the predicted label and the pseudo label may be calculated based on, for example, cross entropy. However, the scope of the present disclosure is not limited thereto. For better understanding, the current operation will be further described with reference to FIG. 12.

Figure 12:
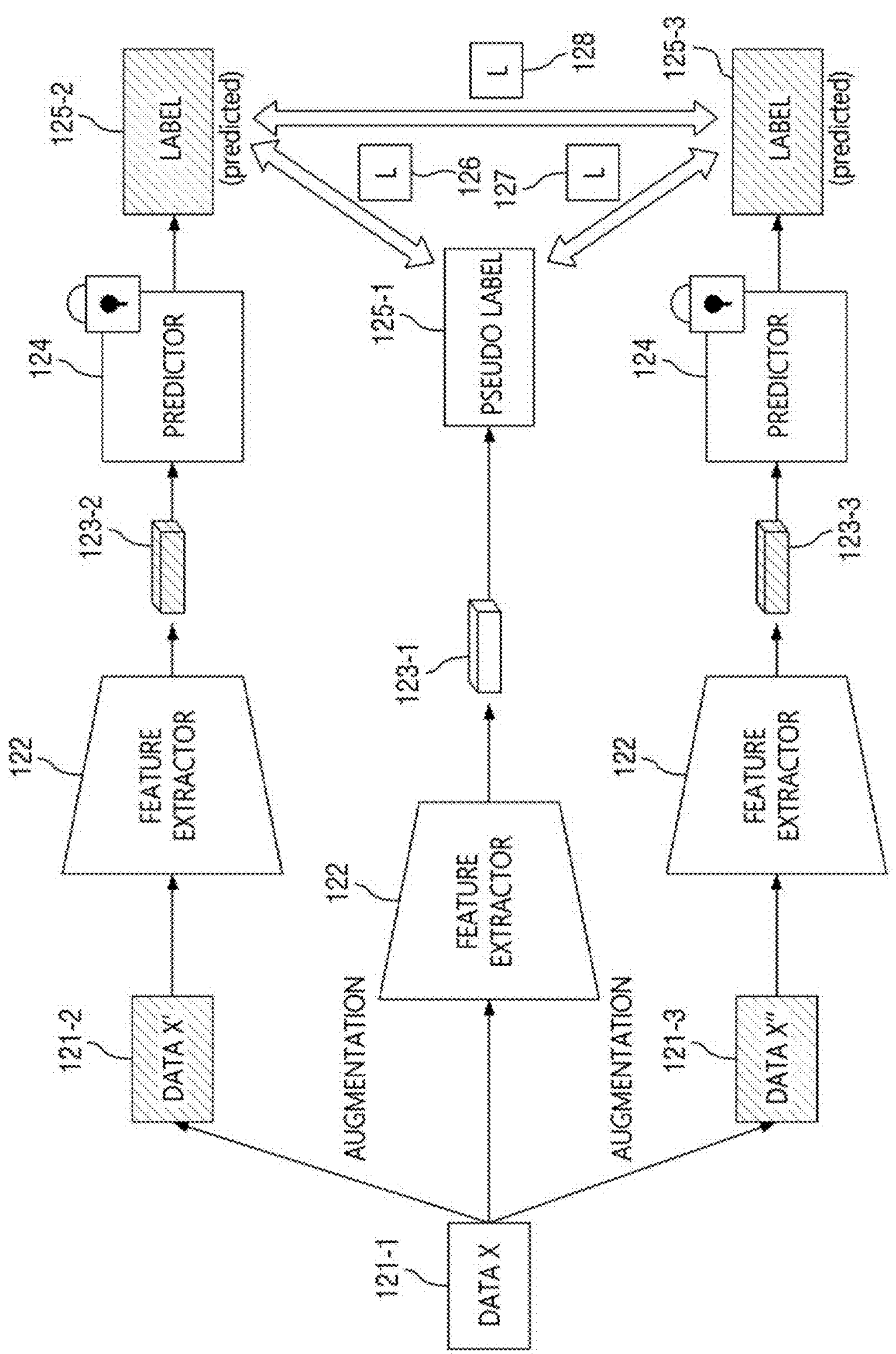
FIG. 12 is an example diagram for further explaining the method of calculating the consistency loss according to the embodiments.

FIG. 12 illustrates, like FIG. 9, a case where two virtual data samples 121-2 and 121-3 are generated from a data sample 121-1 of the target dataset. For a clearer explanation, the data sample 121-1 and the two virtual data samples 121-2 and 121-3 will be referred to as a 'first data sample 121-1 (see x)', a 'second data sample 121-2 (see x')', and a 'third data sample 121-3 (see x")', respectively. For reference, a lock symbol shown on a predictor 124 in FIG. 12 indicates that the predictor 124 is in a frozen state.

As illustrated in FIG. 12, the adaptation system 10 may generate a pseudo label 125-1 using a feature 123-1 extracted from the first data sample 121-1. This may be understood from the description of FIG. 11.

Next, the adaptation system 10 may extract features 123-2 and 123-3 from the second data sample 121-2 and the third data sample 121-3 through a feature extractor 122. Then, the adaptation system 10 may input the extracted features 123-2 and 123-3 to the predictor 124 to predict labels 125-2 and 125-3 of the data samples 121-2 and 121-3.

Next, the adaptation system 10 may calculate consistency losses 126 and 127 based on differences between the pseudo label 125-1 and the predicted labels 125-2 and 125-3. For example, the adaptation system 10 may calculate the consistency loss 126 between the first data sample 121-1 and the second data sample 121-2 based on the difference (e.g., cross entropy) between the pseudo label 125-1 and the predicted label 125-2 and may calculate the consistency loss 127 between the first data sample 121-1 and the third data sample 121-3 based on the difference (e.g., cross entropy) between the pseudo label 125-1 and the predicted label 125-3.

In some cases, the adaptation system 10 may further calculate a consistency loss 128 between the virtual data samples 121-2 and 121-3 based on a difference between the predicted labels 125-2 and 125-3.

In addition, in some cases, the adaptation system 10 may calculate a total consistency loss by aggregating the exemplified consistency losses 126 through 128 based on predetermined weights. Here, a smaller weight may be assigned to the consistency loss 128 between the virtual data samples 121-2 and 121-3 than to the other losses 126 and 127.

Until now, embodiments of the consistency loss calculation method have been described in detail with reference to FIGS. 9 through 12. According to the above description, the feature-related consistency loss (i.e., the 'first consistency loss') and the label-related consistency loss (i.e., the 'second consistency loss') may be accurately calculated, and a high-performance target model may be built by training the feature extractor using the calculated consistency loss.

Results of experiments conducted to prove the effect of the above-described domain adaptation method will now be briefly described.

The inventors of the present disclosure conducted an experiment to measure the classification performance of a target model on which domain adaptation was performed using MNIST, Steet View House Numbers (SVHN), and United States Postal Service (USPS) datasets. Specifically, the present inventors built a target model by additionally training a source model based on three types of losses (the first consistency loss, the second consistency loss, and the entropy loss) according to the above-described method. In addition, the present inventors repeatedly measured the classification accuracy of the built target model and calculated mean accuracy (see 'mean') and standard deviation (see 'std') by aggregating the measurement results (see 'proposed method').

In addition, for performance comparison, the present inventors measured, in the same way, the classification accuracy of a source model (see 'additional learning x'), the classification accuracy of a model (see 'MUDA') additionally trained using a multi-source unsupervised domain adaptation (MUDA) technique which is one of the state-of-the-art (SOTA) techniques using a source dataset, and the classification accuracy of a model (see 'supervised learning') additionally trained using a labeled dataset of a target domain. The measurement results are shown in Table 1 below.

TABLE 1

| | SVHN -> MNIST | | MNIST -> SVHN | | MNIST -> USPS | | USPS -> MNIST | |
|---|---|---|---|---|---|---|---|---|
| Category | Mean | Std | Mean | Std | Mean | Std | Mean | Std |
| Additional learning x | 70.0 | 1.2 | 47.8 | 0.7 | 77.4 | 2.9 | 84.9 | 0.8 |
| MUDA | 99.1 | 0.4 | — | — | 98.5 | 0.1 | 96.7 | 0.4 |
| Supervised learning | 99.6 | 0.0 | 92.5 | 0.3 | 99.5 | 0.1 | 99.8 | 0.1 |
| Proposed method | 99.5 | 0.1 | 90.3 | 0.7 | 99.2 | 0.1 | 98.9 | 0.1 |

As shown in Table 1, the performance of the method according to the embodiments significantly exceeds the performance of the source model. Accordingly, it may be understood that the method according to the embodiments may easily solve the domain shift problem. In addition, it may be seen that the performance of the method according to the embodiments is superior to the performance of the SOTA technique using the source dataset and is almost equivalent to the performance of the supervised learning model.

In addition, the present inventors conducted an experiment of clustering features extracted by a feature extractor and outputting the clustered features in order to compare feature spaces of a source dataset and a target dataset formed by a source model and a target model. The MNIST dataset was used as the source dataset, and the SVHN dataset was used as the target dataset. The results of the experiment are shown in FIGS. 13 through 16.

Figure 13:
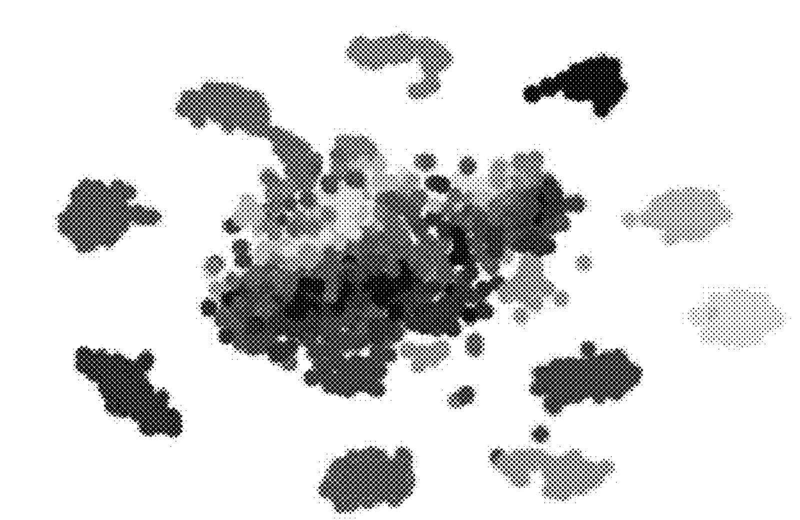
FIGS. 13 through 16 show the results of clustering features extracted by a source model and a target model.
Figure 14:
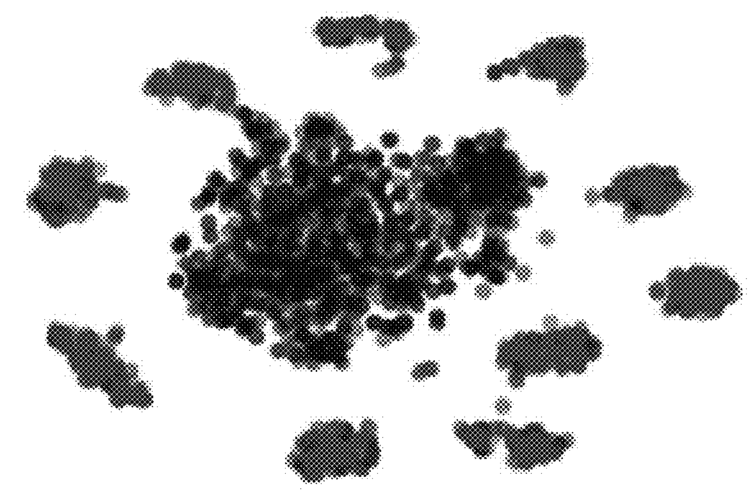
Figure 15:
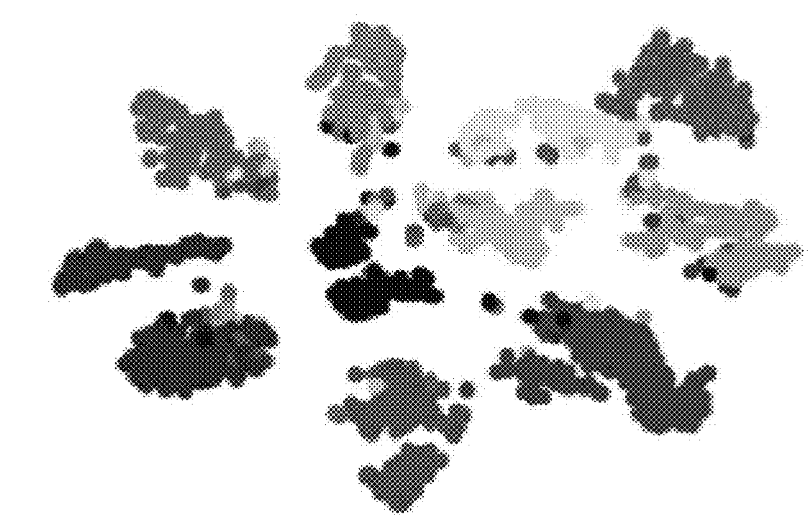
Figure 16:
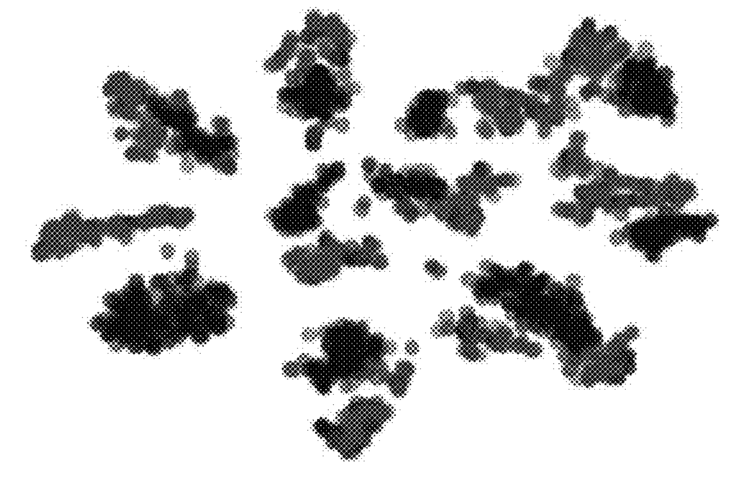

FIG. 13 shows features of the source dataset and the target dataset extracted by the source model in a different color for each class. FIG. 14 shows the features extracted by the source model in a different color for each domain. FIG. 15 shows features of the source dataset and the target dataset extracted by the target model in a different color for each class. FIG. 16 shows the features extracted by the target model in a different color for each domain. In FIG. 14, features located in the center represent features of a source domain (i.e., features extracted from the source dataset).

Referring to FIGS. 13 and 14, the features (hereinafter, 'source features') extracted from the source dataset mostly form a cluster in the center, whereas the features (hereinafter, 'target features') extracted from the target dataset form clusters in the periphery. Accordingly, it may be seen that a difference in distribution between the source dataset (domain) and the target dataset (domain) is generally quite large (i.e., the seriousness of the domain shift problem may be understood).

Referring to FIGS. 15 and 16, the features of the source dataset and the target dataset are well aligned in the target model and are well aligned for each class. Accordingly, it may be seen that the method according to the embodiments may solve the domain shift problem and makes it possible to build a high-performance target model even in a target domain in which labels do not exist.

Until now, the results of the experiments performed to prove the effect of the domain adaptation method according to the embodiments have been briefly described with reference to Table 1 and FIGS. 13 through 16. Hereinafter, an example computing device 170 that may implement the adaptation system 10 according to the embodiments of the present disclosure will be described with reference to FIG. 17.

FIG. 17 illustrates the hardware configuration of a computing device 170.

Referring to FIG. 17, the computing device 170 may include one or more processors 171, a bus 173, a communication interface 174, a memory 172 which loads a computer program 176 to be executed by the processors 171, and a storage 175 which stores the computer program 176. In FIG. 17, only the components related to the embodiments of the present disclosure are illustrated. Therefore, it will be understood by those of ordinary skill in the art to which the present disclosure pertains that other general-purpose components may be included in addition to the components illustrated in FIG. 17. That is, the computing device 170 may further include various components other than the components illustrated in FIG. 17. In addition, in some cases, some of the components illustrated in FIG. 17 may be omitted from the computing device 170. Each component of the computing device 170 will now be described.

The processors 171 may control the overall operation of each component of the computing device 170. The processors 171 may include at least one of a central processing unit (CPU), a micro-processor unit (MPU), a micro-controller unit (MCU), a graphic processing unit (GPU), and any form of processor well known in the art to which the present disclosure pertains. In addition, the processors 171 may perform an operation on at least one application or program for executing operations/methods according to embodiments of the present disclosure. The computing device 170 may include one or more processors.

Next, the memory 172 may store various data, commands and/or information. The memory 172 may read the program 176 from the storage 175 in order to execute operations/methods according to embodiments of the present disclosure. The memory 172 may be implemented as a volatile memory such as a random access memory (RAM), but the technical scope of the present disclosure is not limited thereto.

Next, the bus 173 may provide a communication function between the components of the computing device 170. The bus 173 may be implemented as various forms of buses such as an address bus, a data bus, and a control bus.

Next, the communication interface 174 may support wired and wireless Internet communication of the computing device 170. In addition, the communication interface 174 may support various communication methods other than Internet communication. To this end, the communication interface 174 may include a communication module well known in the art to which the present disclosure pertains.

Next, the storage 175 may non-temporarily store one or more programs 176. The storage 175 may include a non-volatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

Next, the computer program 176 may include one or more instructions for controlling the processors 171 to perform operations/methods according to various embodiments of the present disclosure when the computer program 176 is loaded into the memory 172. That is, the processors 171 may perform the operations/methods according to the various embodiments of the present disclosure by executing the loaded instructions.

For example, the computer program 176 may include one or more instructions for performing an operation of obtaining a model trained using a labeled dataset of a source domain, an operation of selecting a first data sample from an unlabeled dataset of a target domain, an operation of generating a second data sample through data augmentation on the first data sample, an operation of calculating a consistency loss between the first data sample and the second data sample using a feature extractor or a predictor of the trained model, and an operation of updating the feature extractor based on the consistency loss. In this case, the adaptation system 10 according to the embodiments of the present disclosure may be implemented through the computing device 170.

In some embodiments, the computing device 170 illustrated in FIG. 17 may be a virtual machine implemented based on cloud technology. For example, the computing device 170 may be a virtual machine operating on one or more physical servers included in a server farm. In this case, at least some of the processors 171, the memory 172, and the storage 175 illustrated in FIG. 17 may be virtual hardware, and the communication interface 174 may also be a virtualized networking element such as a virtual switch.

Until now, an example computing device 170 that may implement the adaptation system 10 according to the embodiments of the present disclosure has been described with reference to FIG. 17.

Until now, various embodiments of the present disclosure and effects of the embodiments have been described with reference to FIGS. 1 through 17. However, the effects of the technical spirit of the present disclosure are not restricted to the one set forth herein. The above and other effects of the embodiments will become more apparent to one of daily skill in the art to which the embodiments pertain by referencing the claims.

According to embodiments of the present disclosure, domain adaptation may be performed on a source model (i.e., a model that has learned a labeled dataset of a source domain) using only an unlabeled dataset of a target domain (i.e., in an unsupervised manner). Therefore, a target model may be easily built even in an environment in which access to the labeled dataset of the source domain is restricted due to reasons such as security and privacy. That is, domain adaptation may be easily performed even in a source-free environment.

In addition, at least one virtual data sample may be generated through data augmentation on a data sample of the target domain. In addition, a high-performance target model may be easily built by additionally training the source model based on a consistency loss between the data sample and the virtual data sample.

In addition, a consistency loss may be calculated based on a difference between a feature extracted from the data sample and a feature extracted from the virtual data sample. This feature-related consistency loss may improve the performance of the target model by additionally training a feature extractor to extract similar features from similar data samples of the target dataset.

In addition, a consistency loss may be calculated based on a difference between a pseudo label for the data sample and a predicted label for the virtual data sample. This label-related consistency loss may further improve the performance of the target model by aligning a feature space of the target dataset (or domain) with a feature space of the source dataset (or domain).

In addition, a prototype feature for each class may be generated by reflecting a confidence score for each class in features extracted from a plurality of data samples, and a pseudo label may be generated based on a similarity between the prototype feature for each class and the feature extracted from the above data sample. Accordingly, a pseudo label may be accurately generated even in an environment in which there is no label of the target dataset.

In addition, the source model may be additionally trained based further on entropy loss. In this case, the feature extractor may be additionally trained so that features extracted from the target dataset move away from a decision (classification) boundary in the feature space. Therefore, a predictor may be prevented from outputting an ambiguous confidence score for each class. Accordingly, the performance of the target model may be further improved.

In addition, only the feature extractor of the source model may be updated in a state where the predictor of the source model is frozen. In this case, the feature space of the target dataset may be quickly and accurately aligned with the feature space of the source dataset, and thus the performance of the target model may be further improved.

However, the effects of the technical spirit of the present disclosure are not restricted to the one set forth herein. The above and other effects of the present disclosure will become more apparent to one of daily skill in the art to which the present disclosure pertains by referencing the claims.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multi-tasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A method for domain adaptation performed by at least one computing device, the method comprising:

obtaining a model trained using a labeled dataset of a source domain, wherein the model comprises a feature extractor configured to extract a feature from an input data sample and a predictor configured to predict a label based on the extracted feature;

selecting a first data sample from an unlabeled dataset of a target domain;

generating a second data sample through data augmentation on the first data sample;

calculating a consistency loss between the first data sample and the second data sample by using at least one of the feature extractor or the predictor; and updating the feature extractor based on the consistency loss.

2. The method of claim 1, wherein the model is additionally trained using only the unlabeled dataset of the target domain without using the labeled dataset of the source domain.

3. The method of claim 1, wherein the calculating of the consistency loss comprises:

extracting a first feature from the first data sample through the feature extractor;

extracting a second feature from the second data sample through the feature extractor; and calculating the consistency loss based on a difference between the first feature and the second feature.

4. The method of claim 3, wherein the calculating of the consistency loss based on the difference between the first feature and the second feature comprises:

calculating a first consistency loss based on the difference between the first feature and the second feature;

predicting a label of the second data sample through the trained model;

calculating a second consistency loss based on a difference between the predicted label and a pseudo label for the first data sample; and calculating the consistency loss by aggregating the first consistency loss and the second consistency loss based on predetermined weights, wherein a weight assigned to the first consistency loss is less than or equal to a weight assigned to the second consistency loss.

5. The method of claim 1, wherein the calculating of the consistency loss comprises:

generating a pseudo label for the first data sample using the trained model;

predicting a label of the second data sample through the trained model; and calculating the consistency loss based on a difference between the pseudo label and the predicted label.

6. The method of claim 5, wherein the predictor is configured to predict a class label of the input data sample, and the generating of the pseudo label comprises:

selecting a plurality of data samples from the unlabeled dataset of the target domain;

extracting a plurality of features from the plurality of data samples through the feature extractor;

generating a prototype feature for each class by aggregating the plurality of features based on a confidence score for each class for each of the plurality of data samples; and generating the pseudo label based on a similarity between a feature of the first data sample extracted through the feature extractor and the prototype feature for each class.

7. The method of claim 1, wherein the predictor is configured to predict a class label of the input data sample, and further comprising:

calculating a confidence score for each class for the first data sample through the trained model; and updating the feature extractor based on an entropy loss for the confidence score for each class.

8. The method of claim 1, wherein the consistency loss is a loss related to a feature extracted using the feature extractor, and the predictor is configured to predict a class label of the input data sample, and wherein the updating of the feature extractor comprises:

calculating a confidence score for each class for the first data sample through the trained model;

aggregating an entropy loss for the confidence score for each class and the consistency loss based on predetermined weights; and updating the feature extractor based on a result of the aggregating, wherein a weight assigned to the entropy loss is greater than or equal to a weight assigned to the consistency loss.

9. The method of claim 1, wherein the consistency loss is a loss related to a label predicted using the predictor, and the predictor is configured to predict a class label of the input data sample, and wherein the updating of the feature extractor comprises:

calculating a confidence score for each class for the first data sample through the trained model;

aggregating an entropy loss for the confidence score for each class and the consistency loss based on predetermined weights; and updating the feature extractor based on a result of the aggregating, wherein a weight assigned to the entropy loss is less than or equal to a weight assigned to the consistency loss.

10. The method of claim 1, further comprising:

generating a third data sample through data augmentation on the first data sample; and updating the feature extractor through a consistency loss between the second data sample and the third data sample.

11. The method of claim 1, wherein the updating of the feature extractor comprises updating the feature extractor in a state where the predictor is frozen.

12. A method for domain adaptation performed by at least one computing device, the method comprising:

obtaining a model built through training on a labeled dataset of a source domain and additional training on an unlabeled dataset of a target domain, wherein the model comprises a feature extractor configured to extract a feature from an input data sample and a predictor configured to predict a label based on the extracted feature; and predicting a label of data belonging to the target domain by using the model, wherein the additional training comprises:

selecting a first data sample from the unlabeled dataset of the target domain;

generating a second data sample through data augmentation on the first data sample;

calculating a consistency loss between the first data sample and the second data sample by using at least one of the feature extractor or the predictor; and updating the feature extractor based on the consistency loss.

13. The method of claim 12, wherein the model is additionally trained using only the unlabeled dataset of the target domain without using the labeled dataset of the source domain.

14. The method of claim 12, wherein the updating of the feature extractor comprises updating the feature extractor in a state where the predictor is frozen.

15. A system for domain adaptation comprising:

one or more processors; and a memory storing one or more instructions, wherein the one or more processors, by executing the stored one or more instructions, perform:

obtaining a model trained using a labeled dataset of a source domain, wherein the model comprises a feature extractor configured to extract a feature from an input data sample and a predictor configured to predict a label based on the extracted feature;

selecting a first data sample from an unlabeled dataset of a target domain;

generating a second data sample through data augmentation on the first data sample;

calculating a consistency loss between the first data sample and the second data sample by using at least one of the feature extractor or the predictor; and updating the feature extractor based on the consistency loss.

* * * * *